United States Patent [19]

Reeves

[11] 4,017,586

[45] Apr. 12, 1977

[54] STACK GAS TREATMENT

[76] Inventor: Adam A. Reeves, P.O. Box 781, Rifle, Colo. 81650

[22] Filed: Aug. 6, 1975

[21] Appl. No.: 602,291

[52] U.S. Cl. .................................. 423/242; 423/522
[51] Int. Cl.² ................... C01B 17/00; C01B 17/72
[58] Field of Search .......................... 423/242–244, 423/573 G, 574 G, 522

[56] References Cited

UNITED STATES PATENTS

| 2,551,905 | 5/1951 | Robinson | 423/573 G |
| 2,685,343 | 8/1954 | Permann | 423/244 |
| 3,870,480 | 3/1975 | Moss | 423/244 |

FOREIGN PATENTS OR APPLICATIONS

| 1,183,937 | 3/1970 | United Kingdom | 423/244 |

*Primary Examiner*—Earl C. Thomas
*Assistant Examiner*—Gregory A. Heller

[57] ABSTRACT

Hot stack gases transfer contained heat to a gravity flow of pebbles treated with a catalyst, cooled stacked gases and a sulfuric acid mist is withdrawn from the unit, and heat picked up by the pebbles is transferred to air for combustion or other process. The sulfuric acid (or sulfur, depending on the catalyst) is withdrawn in a recovery unit.

2 Claims, 4 Drawing Figures

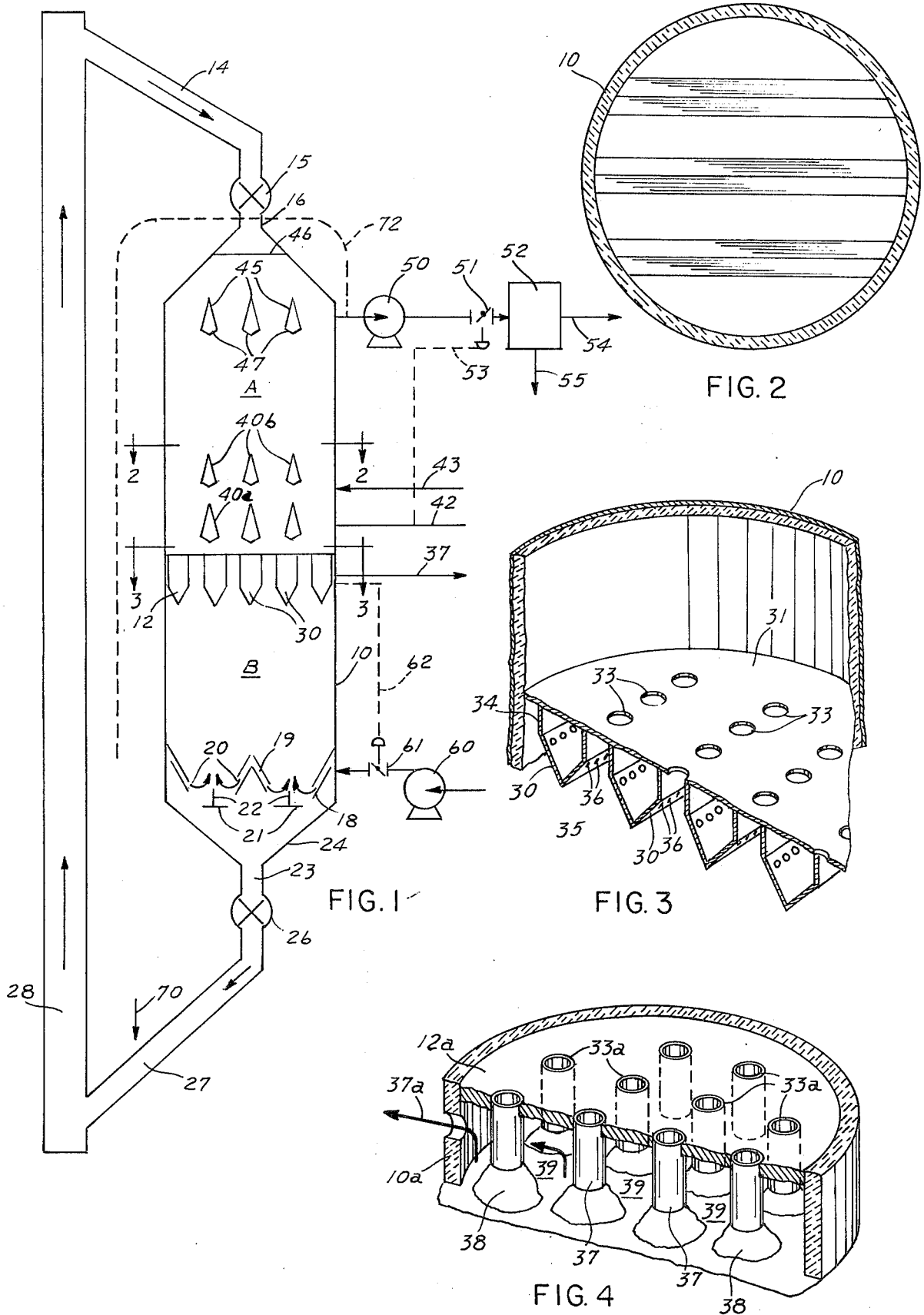

STACK GAS TREATMENT

This invention relates to a stack gas treatment system, reducing air pollution and recovering waste heat by using a continuous gravity flow pebble stove apparatus. Sulfur contaminants in these stack gases are oxidized or reduced to recoverable products, and heat is transferred to combustion or process air.

A common method of treating sulfur-containing stack gas is the use of scrubbers using lime or limestone slurries. The equipment suffers from a rapid buildup of calcium salts as a dense scale. The cool flue gas must be heated again to provide adequate buoyancy at the top of the stack to insure dispersion into the atmosphere.

Included among the objects and advantages of the present invention is to provide apparatus for removing sulfur contaminants in stack gas and for the recovery of waste heat in the stack gas for use.

Another object of the invention is to provide an economical method of sulfur recovery from stack gas and recovery of waste heat therein.

Yet another object of the invention is to provide a method of recovery of sulfur from stack gases as elemental sulfur by using a reducing agent to reduce sulfur contaminants to elemental sulfur which is recovered in an electrostatic precipitator, either as a dust or liquid mist.

A still further object of the invention is to provide a method for the recovery of sulfur contaminants in a stack gas by using an oxidizing agent to oxidize the sulfur material to sulfuric acid which may then be recovered.

Another object of the invention is to remove and discard sulfur in an innocuous form.

These and other objects and advantages of the invention may be readily ascertained by referring to the following description and appended illustrations, in which:

FIG. 1 is a side elevational view of a double-chambered, vertical pebble stove showing some of the environmental conditions of various streams in and out of the vertical vessel;

FIG. 2 is a cross sectional view of the vertical vessel taken along section lines 2—2;

FIG. 3 is an isometric view of the separator of the vessel taken along section lines 3—3; and FIG. 4 is a schematic view of a modified form of vessel divider according to the invention.

In the device illustrated in FIGS. 1–3, a vertical vessel 10 is divided into an upper reaction chamber A and a lower reaction chamber B by means of a vessel divider 12, explained in detail below. The vessel 10 may be made of a metal lined with a material which resists the temperature and the conditions of the reaction vessel. For example, the vessel may be lined with refractory for the high temperature operation of the unit. The vessel is provided with a pebble feed inlet 14 which passes a rotary feeder 15 to introduce pebbles into the vessel through the inlet 16. The pebbles are maintained in the vessel by means of a grate mechanism 18, for example, similar to the one shown in U.S. Pat. No. 3,401,922, issued Sept. 17, 1968. The grate mechanism includes dividers 19 which include fluid inlet openings 20, a support plate mechanism 21 and a pusher bar 22 mounted on each plate to push a requisite bulk volume of pebbles from the vessel as the pusher bars 22 move back across the plates 21. The pebbles discharged from the plates 21 pass to an outlet 23 through the conical bottom 24. A rotary discharge mechanism 26 discharges the pebbles into a pebble chute 27 which discharges into an elevator 28. The top of the elevator 28 discharges into the pebble feeder chute 14. The elevator may be any type of elevator useful for the elevation of particulate matter.

The fluid, normally cool gas, introduced into chamber B through the divider plate openings 20 passes upwardly through a bed of pebbles in the chamber to off-gas collectors 30, shown in detail in FIG. 3. The off-gas collectors 30 may be mounted on a divider plate 31 provided with a plurality of openings 33, which open into chamber B from chamber A. Each off-gas collector extends across the width of the vessel at its location and it includes a tubular member consisting of vertical sides 34 and a V-shaped bottom 35 having a plurality of holes 36 therein. Each of the tubular members are of a length depending upon the position in the circular vessel. The divider plate 31 is arranged to support the pebbles that completely fill chamber A; however, it is possible to provide a plurality of the off-gas collector tubes without the plates and permit the pebbles to pass through the passages between the tubular members into chamber B. Thus, ambient air from a forced draft fan, in one example, is introduced into chamber B at the grate section, passing upwardly through the bed of pebbles heated by gas in chamber A, and exhausts outwardly through the off-gas collectors 30. Hot flue gas at about 600° F heats the pebbles to about 600° F or somewhat lower, and the air passing through the pebbles in chamber B is withdrawn at about 550° F. The pebbles are discharged at about 150°–200° F.

In chamber A, a plurality of inlet manifolds 40a are mounted just above the off-gas collectors 30, and these include inverted V-shaped, hollow beams with a V-bottom having openings similar to that of the V-bottoms of the off-gas collectors 30. In place of the manifolds 40a, fluid distributors such as shown in U.S. Pat. No. 3,589,611, issued June 29, 1971, and U.S. Pat. No. 3,432,348, issued Mar. 11, 1969, may be used to inject fluids into the vessel. Each of these manifolds provides a series of holes for the introduction of a hot flue gas from boilers or process heaters. In some cases, a reducing gas or an oxidizing gas may be introduced into the upper manifolds 40b, where it is desired to reduce or oxidize the sulfur contaminants in the gas. Off-gas collectors 45 are mounted in the top of the vessel below the interface 46 of the pebble bed below the feeder neck 16. These off-gas collectors are pointed as an inverted V, hollow beam for the removal of the gas from the bed of pebbles and exhausting it through gas blower 50. The off-gas collectors 45 may be attached to the gas blower or pump 50 which then exhausts through a control valve 51 which provides gas either to an electrostatic precipitator or other collector means 52. Pressure in line 42 positions damper 51 through control line 53 and a controller not shown. From the electrostatic precipitator 52, cool gas passes through a line 54 to the stack, while solid sulfur or sulfuric acid passes through a discharge line 55 to storage or use. The gases are withdrawn from gas collectors 45 at a temperature of 200°–250° F.

Chamber B is filled with pebbles and the rate of discharge of pebbles through the grate section 18 controls the rate of solids descent in chambers A and B. The vessel may thus be maintained completely full of pebbles which move uniformly down through the vessel, under the influence of gravity, at a rate determined by the grate discharge rate and the feed inlet. Air is fed to the grate gas feed mechanism by means of an air pump 60 which passes a control valve 61, which is controlled by a temperature probe in the off-gas collectors 30 in the top of chamber B. A catalyst solution supply line 70 is arranged to introduce iron sulfate-manganese sulfate (FeSO$_4$-MnSO$_4$) solution for impregnating the pebbles with the catalyst for the oxidation of sulfur contaminants in the stack gas, where the same is desired.

By regulating the pebble withdrawal rate through the grate using the cool gas temperature from a temperature probe 72 at the outlet from the upper off-gas collectors, it is possible to maintain the entering pebbles wet, and to maintain them moist in the upper part of the chamber A. Then the oxidation of sulfur dioxide in the stack gas can take place, where the pebbles are impregnated with the iron sulfate-manganese sulfate catalyst. By proper control, a stable mist of dilute sulfuric acid is formed and it is withdrawn from the pebble stove through the off-gas collectors 45 and recovered in the electrostatic precipitator 52. The stack gas exhausted from the top is in the range of 200° to 250° F, where the hot flue gas is introduced into the lower set of manifolds 40 at a temperature of about 600° F, with the control of the rate of pebbles being controlled by the temperature probe on the off-gas collector. In the oxidation of the sulfur dioxide, more oxygen may be required than is normally present in the flue gas, and the oxygen concentration may be increased by the introduction of air into chamber A and adjustment of pressure balance in the two chambers of the unit. The pebbles which are introduced into the top of the unit, after passing through chamber B and being impregnated with the catalyst, normally enter the unit at 150° to 250° F, and are withdrawn at that temperature through the rotary discharge mechanism 26. The ambient air passing through the air pump 60 and through the pebbles in the chamber B is withdrawn hot through the withdrawal line 37, so the preheated air may be sent to furnaces, boilers, or to a process heater.

Another method of operation is to introduce a reducing gas with the hot flue gas. Normally, the reducing gas is introduced into the upper manifolds 40b in chamber A. This provides for the injection of the reducing gas into chamber A above the injection of the flue gas, giving a mixture of gas in contact with the pebbles. One suitable reducing gas is hydrogen sulfide, and this is available in petroleum refineries and in many other types of chemical plants. Elemental sulfur is produced from sulfur dioxide with hydrogen sulfide according to the following formula:

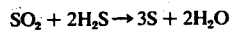

$$SO_2 + 2H_2S \rightarrow 3S + 2H_2O$$

The produced sulfur is in the form of small particles of solid elemental sulfur, and these are swept from the pebble stove along with the cooled stack gas through the upper manifolds 45. The mixture is passed into the electrostatic precipitator where the sulfur is recovered as elemental sulfur dust. The melting point of sulfur is 238° F. If the off-gas temperature is controlled between 250° and 280° F, the particles of sulfur will be liquid droplets. Another reducing gas is hydrogen, and this reduces the sulfur contaminants to elemental sulfur and water. Hydrogen-containing gas is, of course, available in various gas streams in refineries and in other chemical plants. In cases where it is not present, the hydrogen may be generated specifically for the purpose.

By using the forced draft fan for the inlet of air, chamber B may be isolated from chamber A in the fluid sense, so that a pressure differential may exist between chamber A and chamber B with very little, if any, mixing of the gas across the chamber separator which includes the off-gas collectors from chamber B. This is further enhanced by the use of an induced draft pump 50 for the withdrawal of the cooled flue gases from chamber A. Where it is desired to have complete isolation of chamber A and chamber B, a purge gas, that is a neutral gas, may be introduced into the pebble openings between chamber A and chamber B at the off-gas collectors 30 for maintaining the two chambers separated in the fluid sense. The pebbles, of course, are passed through the top chamber into the bottom chamber, while the gaseous reactants of chambers A and B are kept separate.

A modified divider is shown in FIG. 4, wherein a vertical shaft vessel 10a is provided with a plate 12a separating the vessel into upper and lower chambers, as explained for FIG. 1. The plate includes a plurality of openings 33a providing communication between the two chambers. A downwardly extending tube 37 is secured in each opening so as to pass particulate matter from the upper chamber to the lower chamber. With chambers maintained full the particulate material 38 forms piles ending into a fully filled lower chamber below the piles. This leaves a space 39 above the particulate matter and around the downcomer tubes 37. This provides disengaging space for gas from the solids, with the gas being discharged out the outlet 37a.

An important concept in the invention is to provide a means for passing the particulate matter through the unit at a uniform rate across the cross-sectional dimension of the unit. This is means provided by a grate mechanism, such as shown in U.S. Pat. No. 3,401,922, with some minor disruption of the passage of the pebbles at the dividing member of the two chambers. However, on the whole, the pebbles pass uniformly through chamber A into chamber B where they pass uniformly out through the gate. This prevents channeling and provides for the uniform heating of the pebbles and the uniform treatment of the gas passing through the pebbles.

An alternate operation for processing stack gas is to use granular limestone or dolomite for the circulating pebbles. In this case, the sulfur oxides would react with the solid to form sulfites or sulfates. The reacted surface could be abraded by screening or tumbling before being elevated to the top of chamber A. Makeup solids would be added to maintain the solids inventory. The resulting sulfur compounds would be discarded. The effluent gas from the top of the unit would be cleaned of dust before the flue gas is ducted to the stack. The normally acidic sulfur compositions, oxides or sulfides, are oxidized by the carbonates to form sulfites, sulfates or sulfides of calcium or magnesium which may be recovered in an electrostatic precipitator. Nitrogen oxides may be removed from stack gas by their reaction with additives on the particulate solids or even treated, disposable particulates.

What is claimed is:

1. A process for the reduction of sulfur dioxide in stack gas and for heating a stream of air in a vertically mounted two compartment reactor providing two vertically positioned zones comprising:

a. forming a gravity flow, continuously moving vertical bed of pebbles through said vertically aligned separate zones joined together with a minimum cross-section communication passage therebetween;

b. feeding pebbles into the top of the upper zone at a temperature of about 150°–250° F. and withdrawing the same from the bottom of the lower zone at a temperature of 150°–200° F. to maintain both zones full of pebbles and in solids communication with each other;

c. passing a heated stack containing sulfur dioxide at about 600° F into the lower end of the upper zone through said pebbles and withdrawing a clean stack gas at about 200°–250° F from the upper end thereof, said fluid stream being heated substantially above the maximum temperature of said pebbles;

d. passing ambient air into the lower end of the lower zone, through the pebbles, and withdrawing heated air from the upper end of the lower zone;

e. introducing an iron sulfate-manganese sulfate catalytic agent in solution into the upper zone along with said pebbles to wet the pebbles and to react oxygen of the air with sulfur compositions in the heated fluid stream;

f. regulating the pebble withdrawal rate from said lower zone in accordance with the temperature of the withdrawn stack gas so as to maintain the pebbles moist in the upper portion of the upper chamber so as to permit oxidation of the sulfur dioxide in the stack gas; and g. subjecting withdrawn spent fluid to a collector for resultant sulfuric acid to produce a cooled relatively sulfur-free gaseous fluid system.

2. A process according to claim 1, wherein:
said pebbles are recycled from withdrawal to the feeding, and make up pebbles are added to maintain both zones full of pebbles.

* * * * *